Figure 1:
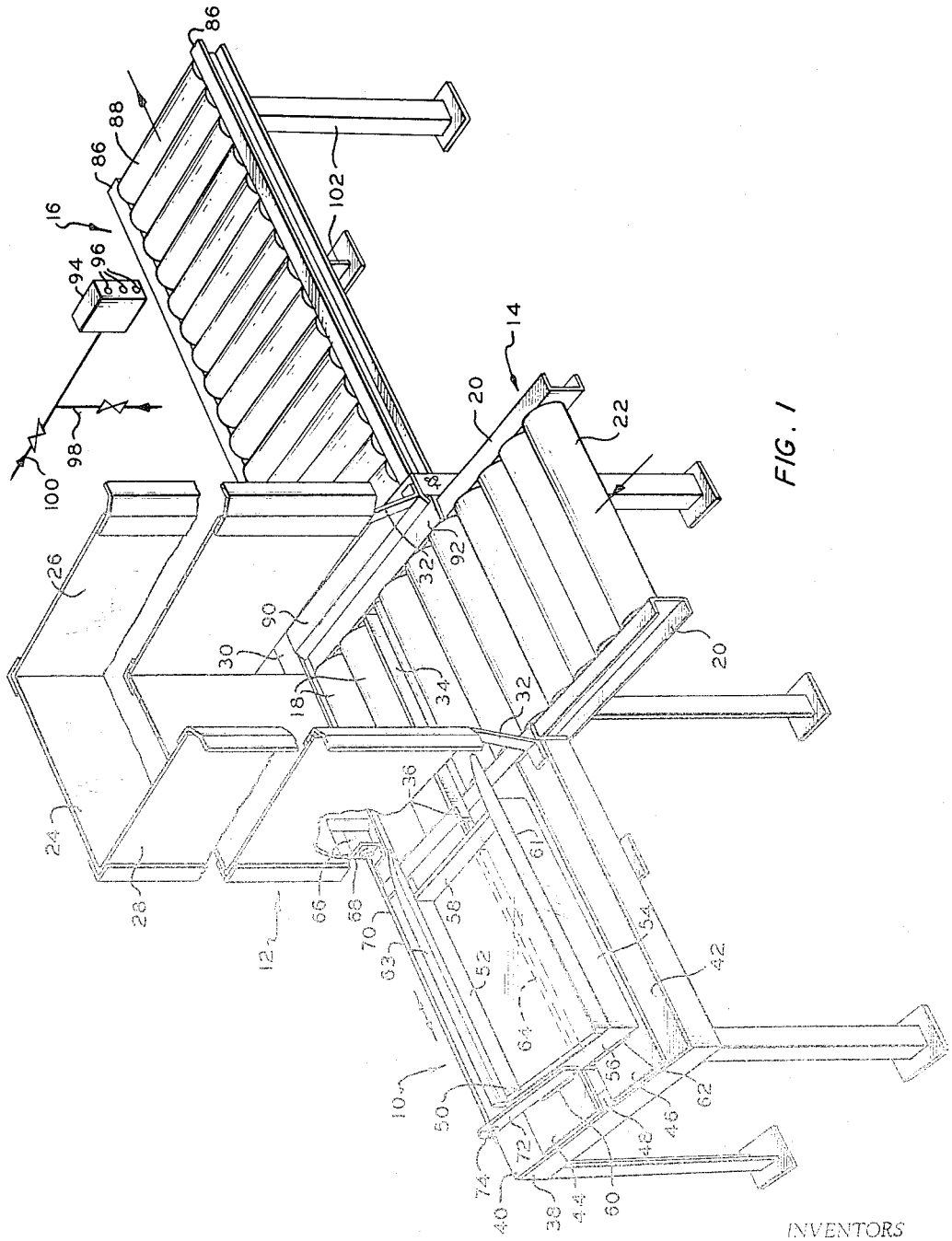

INVENTORS
R.A. CARLE
J.D. WILLIAMS
BY Young & Quigg
ATTORNEYS

INVENTORS
R.A. CARLE
J.D. WILLIAMS
BY *Young & Quigg*
ATTORNEYS

Dec. 6, 1966  R. A. CARLE ETAL  3,289,861
APPARATUS AND PROCESS FOR HANDLING STACKED
AND NESTED MEMBERS
Filed Oct. 12, 1964  3 Sheets-Sheet 3

INVENTORS
R.A. CARLE
J.D. WILLIAMS
BY
*Young & Quigg*
ATTORNEYS

United States Patent Office 3,289,861
Patented Dec. 6, 1966

3,289,861
APPARATUS AND PROCESS FOR HANDLING STACKED AND NESTED MEMBERS
Robert A. Carle and James D. Williams, Bartlesville, Okla., assignors to Phillips Petroleum Company, a corporation of Delaware
Filed Oct. 12, 1964, Ser. No. 403,074
7 Claims. (Cl. 214—8.5)

This invention relates to a process and apparatus for handling individual members from a stack of such members in nested relationship.

In various manufacturing processes, stacks of nested articles are produced and moved by conveyor means in stacked and nested condition. In one such process, beverage cases for storing and transporting bottled beverages are blow molded from polyolefin resin such as polyethylene or polypropylene. The beverage cases are provided with lugs on their upper sides intermediate the bottle resevoir holes and the bottoms of the cases are provided with recesses for receiving the lugs. This permits stacking and holding of the various individual cases in the stack in nested relationship to prevent lateral movement of individual cases and unstacking thereof without lifting the cases out of nesting relationship. Stacks of these beverage cases are transported to various processing steps including the printing of the labels on the sides of the cases which processing step is performed individually on the cases passing singly over a conveyor, moving the cases thru a flame heating zone or station and then thru a silk screen printing processing station. This procedure heretofore has required 2 attendants to feed the cases individually onto the conveyor moving past the heating and printing stations.

This invention is concerned with a process and apparatus for automatically feeding individual cases from the bottom of a stack of nested cases onto a conveyor for moving the individual cases thru one or more processing stations.

Accordingly, it is an object of the invention to provide a novel process and apparatus for handling individual members of a stack of nested members. Another object is to provide such a process and apparatus which maintains all of the members of a stack of nested members except the lowermost member in stacked and nested relationship while moving the lowermost member out of the stack onto a conveyor for individual processing. A further object is to provide a carrier and feeder of novel construction for use in an apparatus for handling individual members of a series of stacked and nested members. Other objects of the invention will become apparent upon consideration of the accompanying disclosure.

A broad aspect of the invention comprises means for supporting a stacked and nested series of units or members, a stacking bin enclosing the area above the support means for enclosing 3 sides of the stack and providing a passageway in the sides adjacent the open side and adjacent the bottom of the stack for moving the lowermost unit or member out of the stack thru one passageway with a carrier and feeder means inserted thru the opposite passageway, and a laterally slidable carrier and feeder means having lifting fingers thereon at substantially the level of the top of the lowermost member in the stack, the forward end of the fingers extending in front of the forward end of the feeder means and being tapered at the forward end so as to lift the stack of members above the lowermost member out of nesting arrangement therewith when the feeder is moved into the stack, and means for reciporcating the feeder-carrier means into and out of the stack.

Figure 2:
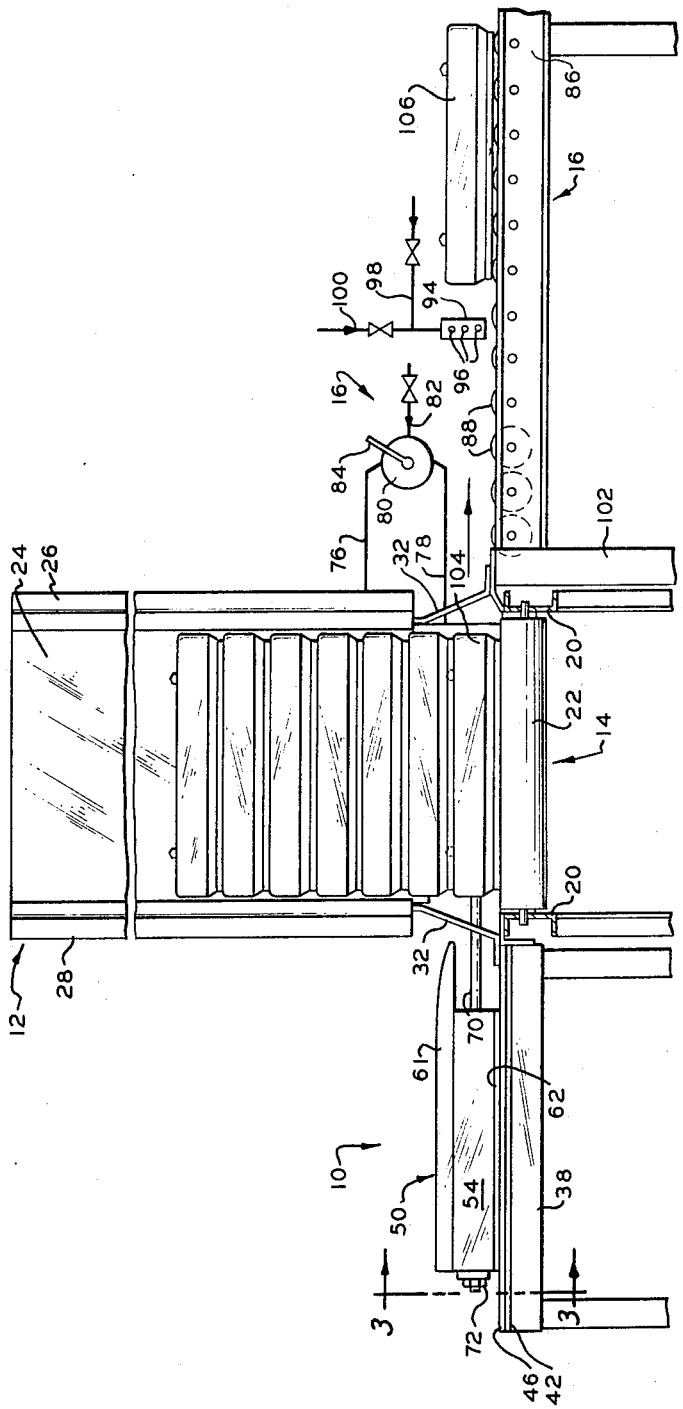
Figures 4, 5:
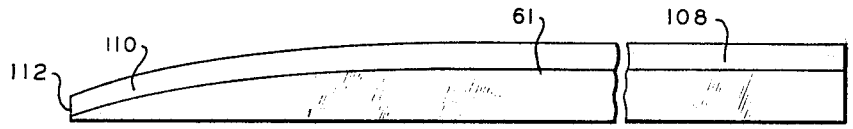
Figure 3:
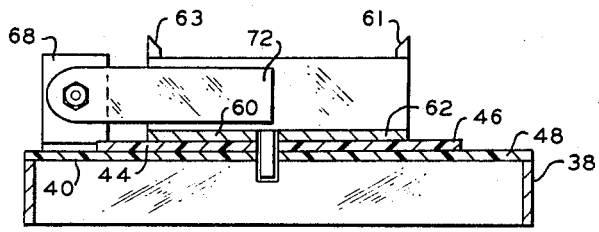
Figure 6:
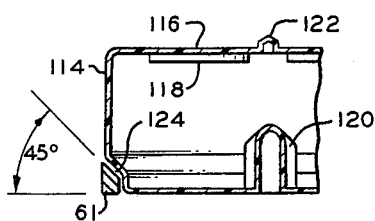

A more complete understanding of the invention may be had by reference to the accompanying schematic drawing of which FIGURE 1 is a pictorial view of a preferred arrangement of apparatus for effecting the invention; FIGURE 2 is a side elevation of the apparatus of FIGURE 1; FIGURE 3 is a vertical section of the feeder-carrier portion of the apparatus of FIGURE 2 taken on the line 3—3; FIGURE 4 is an elevation of one of the carrier fingers of the previous figures; FIGURE 5 is an end view of the finger of FIGURE 4; and FIGURE 6 is a partial transverse section of a beverage case showing its relationship to the carrier fingers during operation.

Referring to FIGURES 1 and 2 the apparatus shown comprises a feeder section 10, a support section 12, an incoming conveyor 14, and an outgoing conveyor 16.

The support means 12 comprises live rollers 18 mounted in a pair of opposed channel irons 20 which also form the supports for a series of live rollers 22 in incoming carrier 14. A stacking bin 24 is open on one side facing conveyor 14 and has 2 wing members 26 and 28 which are spaced apart at their lower edges from the rollers 18 and 22 to provide a passageway underneath the wings for the movable section of carrier-feeder 10 and the lowermost stacked member in the stacking bin. The closed side of 24 is attached directly to a support plate 30 and wings 26 and 28 are supported at their front edges by braces 32 which rest on framework shown and hereinafter described. A guide groove or runway 34 is positioned intermediate live rollers 18 and feed rollers 22 and extends the length of the support means to cooperate with a similar groove or channel in unit 10 discussed hereinafter. An opening 36 in channel iron 20 coincides with groove 34.

Section 10 of the apparatus comprises a table frame 38 provided with cover members 40 and 42 and with skid covers 44 and 46 attached thereto by suitable means such as screws (not shown). The skid covers and table frame covers 40 and 42 are spaced apart at their inner edges to form a guide groove 48. A feeder ram 50 is positioned on skid covers 44 and 46 and comprises a generally rectangular box including side members 52 and 54, rear end member 56 and forward member 58. Skid members 60 and 62 are positioned longitudinally on the bottom of feeder ram 50 in spaced apart relation to accommodate a longitudinal guide member 64. This guide member operates in slot or groove 48 and also in groove 34 which is in alingment therewith, when feeder ram 50 is moved into feeding position within stack bin 24. Lifting fingers 61 and 63 are positioned on the top of feeder ram 50 in alignment with sides 52 and 54 in spaced apart relation so as to enter the stack of members adjacent the outer walls of the member parallel with the feeding direction or movement of feeder ram 50. These fingers are shown in more detail in FIGURES 4 and 5 and will be discussed further in connection therewith.

The means for reciprocating feeder ram 50 into and out of feeding position comprises a double-acting, leg-mounted air cylinder 66 positioned just behind stack bin 24 and supported on plate 30 by means of bracket 68 and a corresponding bracket at the opposite end of the cylinder (not shown). A piston rod 70 connects with the piston in the air cylinder and extends thru cylinder linking plate 72 and attached thereto by a pair of locking nuts 74, one on each side of plate 72. Air cylinder 66 is sufficiently long to provide a stroke adequate for moving feeder ram 50 completely thru operating position within stack bin 24.

As shown in FIGURE 2 the air cylinder is connected at opposite ends with air lines 76 and 78 which connect alternately with channels in rotary valve 80 connecting with air supply line 82 and with the vent of said valve. A hand operated lever 84 actuates the valve and the air cylinder to reciprocate the feeder ram.

Section 16 comprises a conveyor comprising a pair of side channels 86 supporting idler rollers 88. The conveyor channels are tied to the support section 12 by means of plates 90 and 92 by suitable means such as welding.

A flame heating member 94 is positioned opposite the conveyor 16 for applying a hot flame to the side of the beverage cases passing along rollers 88. Individual perforations 96 are provided in the burner plate and the burner is supplied with air thru line 98 and gas thru line 100.

An additional processing station comprising a printing station is positioned along conveyor 16 downstream of flame heater 94 but not shown since it is not a part of the invention.

The various sections 10, 12, 14, and 16 are supported on legs 102 in conventional manner.

Referring to FIGURE 2 a stack of beverage cases 104, 7 of which are shown, is positioned in stack bin 24 with feeder ram 50 in position for another feeding step, case 106 having just previously been fed onto conveyor 16 by forward movement of feeder ram 50 into stack bin 24 and withdrawal thereof to the position shown.

Referring to FIGURES 4 and 5, lifting finger 61, which is identical to finger 63, has a bevel 108 extending the length of the finger and the forwad end 110 is curved to form a relatively thin end 112 for entering the space or groove formed at the outer edges of the stacked cases as will be discussed in connection with FIGURE 6. The end view of the finger shown in FIGURE 5 clearly illustrates the configuration of these fingers.

Referring to FIGURE 6 a beverage case 114 is blow molded to provide indentations 116 for drilling bottle receiving holes 118 and cruciform protuberances 120 which are hollow to receive lugs 122 on the subjacent case. Protuberances 120 are spaced in the bottom of the case extending upwardly therefrom to separate and position the bottoms of the bottles. Finger 61 is shown with a bevel of 45° to provide an engaging surface for a correspondingly beveled section on the lower outside wall of the case. It can be seen clearly from FIGURE 6 how fingers 61 and 63 move into the space provided by the inwardly sloping surface 124 intermediate the adjacent cases. The taper on the forward end of the fingers effectively raises the stack of cases above the lowermost case, as a unit, out of nesting position with the lowermost case so that the forward end 58 of feeder ram 50 pushes the lowermost case out of stack bin 24 onto the rollers 88 of conveyor 16.

The apparatus substantially as shown in the drawing and described herein has been built and is in use in feeding polyolefin beverage cases of the type described from a stack of 10 cases onto a conveyor which feeds the individual cases successively past a flame treating station which oxidizes the side of the case adjacent the burner at the flame station and changes the surface characteristics so that printing can be successfully applied to the treated side of the case. In the apparatus built, a flame treating burner was positioned on each side of the conveyor so as to treat opposite sides of the case simultaneously and the printing station applied the commercial bottle beverage name on both sides of the case.

In the apparatus described, substantially all of the apparatus elements were fabricated of steel. Notable exceptions were the skid members 44 and 46 and 60 and 62 on the bottom of the feeder ram which were fabricated of Marlex polyolefin manufactured by Phillips Petroleum Company. The waxy and low friction characteristic of this material results in long wear and relatively frictionless movement of the feeder ram over the top of the support table.

In the machine constructed, conveyor 14 is actuated by means of an electric eye and a circuit connected with an electric motor which operates the conveyor none of which are shown in the drawing. However, this actuating means is not essential to the invention which is independent of the specific means or method of operating conveyor 14.

While the invention is described principally with respect to handling beverage cases, the apparatus disclosed herein is applicable to the individual feeding of stacked and nested elements of other character in situations where individual members of the stack are to be moved from the bottom of the stack onto a carrier passing thru one or more stations adapted for individual processing steps applied to the elements.

Certain modifications of the invention will become apparent to those skilled in the art and the illustrative details disclosed are not to be construed as imposing unnecessary limitations on the invention.

We claim:

1. Apparatus for feeding individual members from the lowermost position of a series of stacked and nested members comprising in combination:
    (a) support means for holding said series of stacked members in upright position including a bottom support and a rectangular four-sided stacking bin having an open front side, a closed fixed back side and fixed wings on the other two sides, the bottom edges of said two sides being spaced above said bottom support more than the height of one member but less than twice said height;
    (b) first conveyor means for delivering said series of stacked member to the support means of (a) from the open side of the stacking bin;
    (c) second conveyor means leading away from a side of the support means of (a) under one of said wings for receiving individual members from said support means and passing same to a processing station;
    (d) lifter and feeder means positioned outside of the other of said wings movable into said support means under said other of said wings in line with the second conveyor of (c), said lifter and feeder means being provided with fingers for entering between the lowermost and the adjacent member and raising the members of said series above the lowermost member out of nesting position therewith and thereafter moving said lowermost member out of the support means of (a) onto the second conveyor of (c); and
    (e) means for moving the lifter and feeder means of (d) into and out of lifting and feeding position.

2. The apparatus of claim 1 wherein the lifter and feeder means of (d) comprises:
    (1) a supporting table provided with a first guide groove extending in line with the second conveyor of (c) and low friction skid covers each side of said groove;
    (2) a feeder ram in the form of a generally rectangular box having a guide member extending along the bottom thereof adapted to slide in the groove of (1), said box being substantially the height of the individual members of said series, said fingers comprising a pair of lifting fingers on the top of said box parallel with said guide extending forwardly of the forward end of said box, said fingers being spaced apart about the width of said members and tapering from relatively thin to relatively thick from the forward end to an intermediate section to provide entering and lifting force when moved between the lowermost and next upper of said members, and low friction skid means on the bottom of said box adapted to slidably engage the skid covers of (1); and
    (3) a second guide groove in the bottom of the support means of (a) in line with the first groove of (2).

3. The apparatus of claim 2 wherein the means of (e) comprises a double acting air cylinder having a stroke selected to move said feeder ram through operational reciprocation, and operating piston rod connected with said ram, and means for operating said air cylinder.

4. The apparatus of claim 2 wherein said lifting fingers are also downwardly and inwardly beveled on their top edge to cooperate with a correspondingly beveled engaging surface on each said member adjacent the juncture of its bottom and its side parallel with the direction of travel onto the second conveyor of (c).

5. A lifter and feeder apparatus for stacked cases comprising:
   (1) a generally rectangular box having a guide means extending longitudinally along the bottom thereof;
   (2) a pair of lifting fingers extending along the upper edges of the sides of said box parallel with said guide means, said fingers extending forwardly of the end of box a substantial distance and being tapered on their upper edges to form a relatively thin forward end for insertion into a relatively narrow space between stacked and nested cases;
   (3) and a low friction skid means on the bottom of said box.

6. The apparatus of claim 5 wherein the upper edges of said fingers are beveled inwardly and downwardly.

7. A process for handling and unstacking a stack of substantially identical nested members, each having an inwardly sloping surface along its lower sides forming spaces between members for lifting fingers, which comprises the steps of:
   (a) moving said stack laterally through the open side of a rectangular stacking zone having three fixed upright sides and floor support means for said stack, the lower edges of the opposite sides of said zone terminating a distance above said floor more than the height of one said member and less than twice said height;
   (b) inserting a pair of lifting fingers into opposite spaces between the bottom member and the adjacent member and elevating said fingers so as to lift all of the stacked members as a unit, except the bottom member, to free said bottom member of nesting relationship;
   (c) while said bottom member is free, pushing same out from under said stack and off said floor support means onto a conveyor;
   (d) thereafter, lowering the remaining stacked members onto said floor support means;
   (e) repeating steps (b), (c), and (d) until all of said members except the topmost have been moved onto said conveyor; and
   (f) thereafter, pushing said topmost member onto said conveyor.

References Cited by the Examiner
UNITED STATES PATENTS

| | | | |
|---|---|---|---|
| 2,769,570 | 11/1956 | Adams. | |
| 3,069,050 | 12/1962 | Brettrager | 214—8.5 X |
| 3,074,595 | 1/1963 | Boller | 221—225 X |
| 3,169,661 | 2/1965 | Klotz | 221—225 X |
| 3,176,874 | 4/1965 | Temple | 221—225 X |

MARVIN A. CHAMPION, *Primary Examiner.*